United States Patent [19]

Ejike

[11] Patent Number: 5,090,593
[45] Date of Patent: Feb. 25, 1992

[54] APPARATUS AND METHOD FOR DISTRIBUTING SEASONING

[75] Inventor: Ofomata E. Ejike, Lewisville, Tex.

[73] Assignee: Recot, Inc., Plano, Tex.

[21] Appl. No.: 510,769

[22] Filed: Apr. 18, 1990

[51] Int. Cl.⁵ .......................................... B05C 19/00
[52] U.S. Cl. ...................................... 222/1; 222/412; 118/19; 118/24; 99/494
[58] Field of Search ............... 222/311, 412, 411, 410, 222/1; 118/19, 24, 308; 99/494

[56] References Cited

U.S. PATENT DOCUMENTS

| | | | |
|---|---|---|---|
| 2,907,500 | 10/1959 | Kerkvliet | 222/311 |
| 3,147,144 | 9/1964 | Wilhelm | 118/308 |
| 3,155,288 | 11/1964 | Landgraf | 222/311 |
| 3,415,424 | 12/1968 | Crossley | 222/311 |
| 4,493,442 | 1/1985 | Hanson, Jr. | 222/412 |
| 4,543,907 | 10/1985 | Fowler | 118/9 |
| 4,614,162 | 9/1986 | Ryan et al. | 118/19 |

Primary Examiner—Michael S. Huppert
Assistant Examiner—Anthoula Pomrening
Attorney, Agent, or Firm—Rothwell, Figg, Ernst & Kurz

[57] ABSTRACT

A method and apparatus for distributing a wide variety of seasoning material utilizes a hopper for the seasoning material and a tube having one end in fluid communication with the hopper. The tube extends outwardly from the hopper and terminates at a distal end thereof, the tube having a feed section adjacent the hopper and a seasoning delivery section between the feed section and the distal end of the tube. The dispenser includes a motor-driven auger extending from the hopper through the feed section and the delivery section of the tube. Seasoning distribution aperture(s) start at the beginning of the seasoning delivery section on a side of the tube at least 10° from the bottom of the tube so that seasoning exits the side of the tube at the beginning of the seasoning delivery section. The seasoning distribution aperture(s) extend from the beginning of the seasoning delivery section at the side of the tube generally longitudinally toward the end of the tube while the orientation of at least a portion of the seasoning distribution aperture(s) changes progressively downwardly toward the bottom of the tube so that seasoning exits at about the bottom of the tube at the end of the seasoning delivery section of the tube. Variable pitch augers, and a collar that supports and enables rotation of the delivery section to vary the length of the seasoning powder curtain are features of preferred embodiments.

28 Claims, 7 Drawing Sheets

APPARATUS AND METHOD FOR DISTRIBUTING SEASONING

BACKGROUND OF THE INVENTION

1. Field of the Invention

The present invention relates to improvements in devices and methods for the distribution of seasoning materials onto snack foods and the like during the snack food manufacturing process. In particular, the invention provides improvements permitting uniform distribution of a variety of seasoning materials (or "toppings") during the manufacture of snack food items.

2. Description of the Background Art

Many commercially available snack food items include seasonings or other toppings of one form or another deposited upon their surfaces. Examples of such snack foods include potato chips, which can be seasoned with salt, barbecue flavoring, sour cream and onion flavoring, cheese-based toppings, etc. Corn chips and other snack foods items, such as pretzels, corn puffs and popcorn, can be similarly seasoned. In addition to the savory snack food items just described, sweet snacks commonly are topped with powdered and granular sugars, decorative toppings and the like.

While powdered and granular toppings can be applied to snack food items in a variety of manners, a particularly efficient application method includes dispensing the topping onto snack food items which are tumbling in a rotating drum. The tumbling action of the snack food items aids in the even distribution of the topping over the entire contents of the drum. Where the application of a seasoning topping is merely one step in a continuous process for the manufacture of the snack food, it is known to tie the operation of the topping dispenser to the operation of the production line; thus, the topping should be dispensed only while the product is moving along the production line, for example when travelling through and tumbling within the rotating drum.

The commonly used savory snack food seasonings and toppings exhibit a variety of physical properties which govern their behavior during the dispensing operation. "Flour salt," the finely powdered salt used as a topping for potato chips, is extremely dry and free-flowing. Thus, this topping tends to rapidly pass through dispensing equipment, and its flow must be carefully metered and regulated to avoid over-salting the snack food product. Sour cream and onion toppings (as well as cheese-based toppings, and dairy-based and oil-based toppings in general), are relatively moist and tend to resist free flow through dispensing equipment. These relatively "clumpy" or "sticky" toppings tend to clog dispensing apparatus and are prone to intermittent, uneven flow.

Thus, it will be apparent that one important attribute of a topping dispensing apparatus is the ability to dispense, in a controlled, evenly regulated manner, both free-flowing and sticky toppings.

The even distribution of seasoning toppings is important to many aspects of the snack food production process. First, even distribution is essential to providing a uniform appearing and tasting product. One aspect of building consumer loyalty is the ability to provide a uniform-tasting product both within any one given package, as well as over time. Further, uneven or wasteful topping dispensing can adversely impact the economy of the manufacturing process. Over-topped and under-topped items may need to be discarded to avoid inconsistencies in the final, packaged product.

It is known in the art to apply seasonings from a reservoir "hopper," through a metering tube and onto a snack product being tumbled in a rotating drum. For example, commonly owned U.S. Pat. No. 4,614,162 utilizes a tube inserted along the centerline of the tumbling chamber of a rotating drum, through which the seasoning is moved by means of an auger. The bottom of the tube has a series of holes therein, through which the seasoning falls onto snack product in the tumbling chamber. With certain seasonings, such as the dairy-based and oil-based "sticky" toppings described above, uniform seasoning dispersion along the length of the series of seasoning distribution holes is not attained. With these relatively flow-resistant toppings, an undue proportion of the topping passes past the exit holes and is expelled almost entirely from the distal end of the tube. With other seasonings, for example very free-flowing toppings such as flour salt, an undue proportion is expelled through the first few holes closest to the hopper, with very little of the topping reaching the holes at the distal end of the tube. Furthermore, due to the position of the seasoning distribution holes at the bottom of the tube, these free-flowing seasonings continue to fall from the tube after the auger has stopped, until all of the seasoning is drained from the tube onto the product below. When the operation of the auger is keyed to the operation of the entire production line, an undue amount of the topping is applied to the product which is parked beneath the tube. Frequently, this over-seasoned product must be discarded. This continued flow also results in a lag in seasoning distribution when the auger is restarted, and an attendant non-uniform distribution upon start-up.

There thus remains a need in the art for improvements in seasoning distribution devices and methods. Ideally, the distribution apparatus should provide even dispensing of seasoning materials along the entire length of the rotating product-tumbling drum with both very free-flowing and sticky toppings.

SUMMARY OF THE INVENTION

In accordance with the present invention, a method and dispenser apparatus for distributing granular and powdered seasoning material in a regulable, even manner is provided. The invention utilizes a hopper for storing a quantity of seasoning material and a tube having one end (its "proximal end") in fluid communication with the hopper. The tube extends outwardly from the hopper and terminates at an outer, distal end thereof, the tube having a feed portion adjacent the hopper and a seasoning delivery portion between the feed section and the distal end of the tube. The tube has top, bottom and side portions which are defined with reference to a vertical and longitudinal axis passing through the dispenser tube. The dispenser further includes means for transporting the topping therethrough, for example a motor-driven auger. The auger extends from the hopper through the feed section and the delivery section of the tube.

Seasoning distribution means extend along the delivery section of the tube for allowing seasoning material to exit the delivery section of the tube in a uniform manner. The seasoning distribution means have a proximal end adjacent the feed section of the tube and a distal end adjacent the distal end of the tube. The proximal end of the seasoning distribution means is located on a side of the tube at least about 10° from the bottom of the tube so that seasoning exits the side of the tube at the beginning of the seasoning distribution means. The seasoning distribution means extend generally longitudinally toward the end of the tube while the orientation of at least a portion of the seasoning distribution means changes progressively downwardly toward the bottom of the tube, so that at the end of the seasoning distribution means, the seasoning exits at the bottom of the tube. A collar enables the length of the seasoning curtain to be adjusted.

In preferred embodiments, the distribution means is a slot which runs along the entire length of the delivery portion of the device. At the proximal end of the delivery portion the slot opening is oriented at least about 45° from the bottom of the tube. The slot slopes downwardly as it progresses towards the distal end of the tube and terminates adjacent to the open distal end at a position of approximately 0°. Preferred embodiments also include variable-pitch augers which further aid in the uniform distribution of the toppings.

DETAILED DESCRIPTION OF THE PREFERRED EMBODIMENTS

Figure 2:
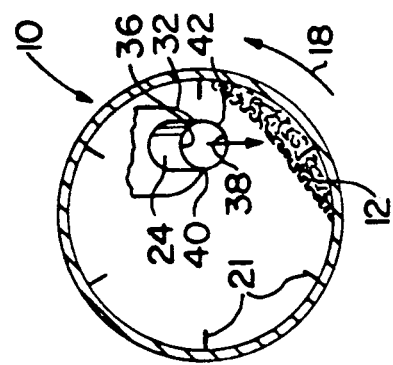
FIG. 2 is a schematic sectional view taken along line 2—2 of FIG. 1.
Figure 1:
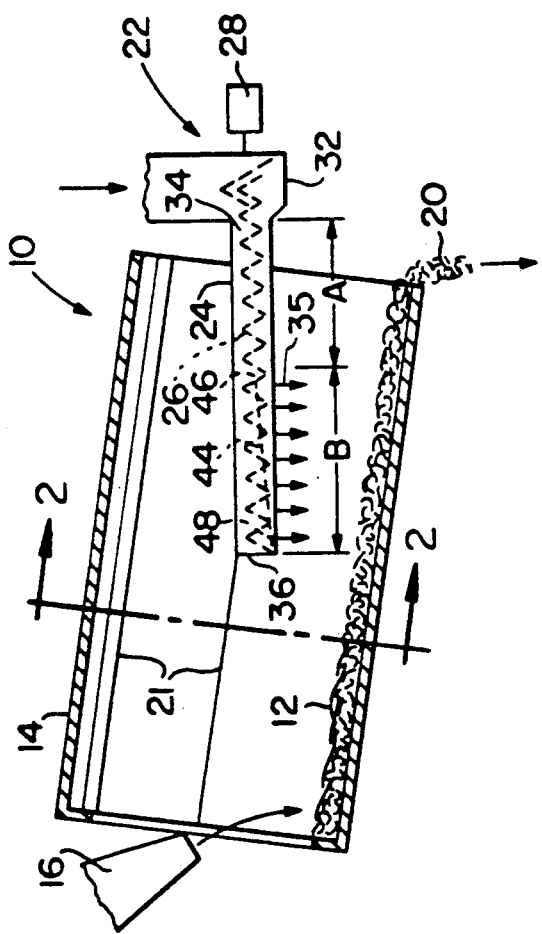
FIG. 1 is a schematic sectional elevation view of a seasoning distribution system containing the apparatus of this invention.

A seasoning application system incorporating a distribution apparatus in accordance with the present invention is illustrated in FIGS. 1 and 2, where the system is indicated generally by the number 10. Unseasoned snack food 12 enters a cylindrical drum 14 at one end through a funnel 16. Drum 14 is tilted slightly at an angle of, for example, about 5°, and is axially rotated in the direction indicated by arrow 18. The speed of rotation of drum 14 can be, for example, 10-15 RPM. The combination of tilt and rotation causes the snack food 12 to travel continuously down the drum to exit 20. Inwardly extending baffles 21 may be positioned radially on the internal drum perimeter to aid in mixing the snack food.

A seasoning dispenser 22 has a generally horizontal, non-rotating tube portion 24 extending into the drum. Within the tube 24 is an auger 26 (shown in phantom lines in FIG. 1) which is rotated by a power source 28 such as an electric motor. A seasoning such as salt, nacho cheese topping, barbecue topping, sour cream and onion topping or the like is fed into the dispenser via a hopper 32 and is conveyed along the tube 24 by auger 26, the tube 24 having a proximal end 34 in fluid communication with hopper 32.

Tube 24 of dispenser 22 is generally comprised of a feed section A adjacent hopper 32, and a seasoning delivery section B downstream thereof. The seasoning material is metered within feed section A to provide a uniform supply to delivery section B. As shown in FIG. 2, tube 24 includes a top 36, a bottom 38 and side portions 40 and 42 which extend between the top 36 and bottom 38 of the tube.

A seasoning distribution means 44, shown by phantom line in FIG. 1 and described in detail below, extends along the delivery section B of tube 24 for allowing seasoning material to exit the delivery section of the tube and fall onto the snack food 12. The seasoning distribution means 44 has a beginning or proximal end 46 adjacent the feed section A of the tube and a distal end 48 adjacent the distal end 36 of tube 24.

In preferred embodiments, for use in the commercial-scale production of snack food items, the feed section A has a length from about 1½ feet to about 5 feet, the delivery section B has a length of from about 1 foot to about 3 feet, and tube 24 has an inner diameter of from about 1 inch to about 2 inches.

Figure 3:
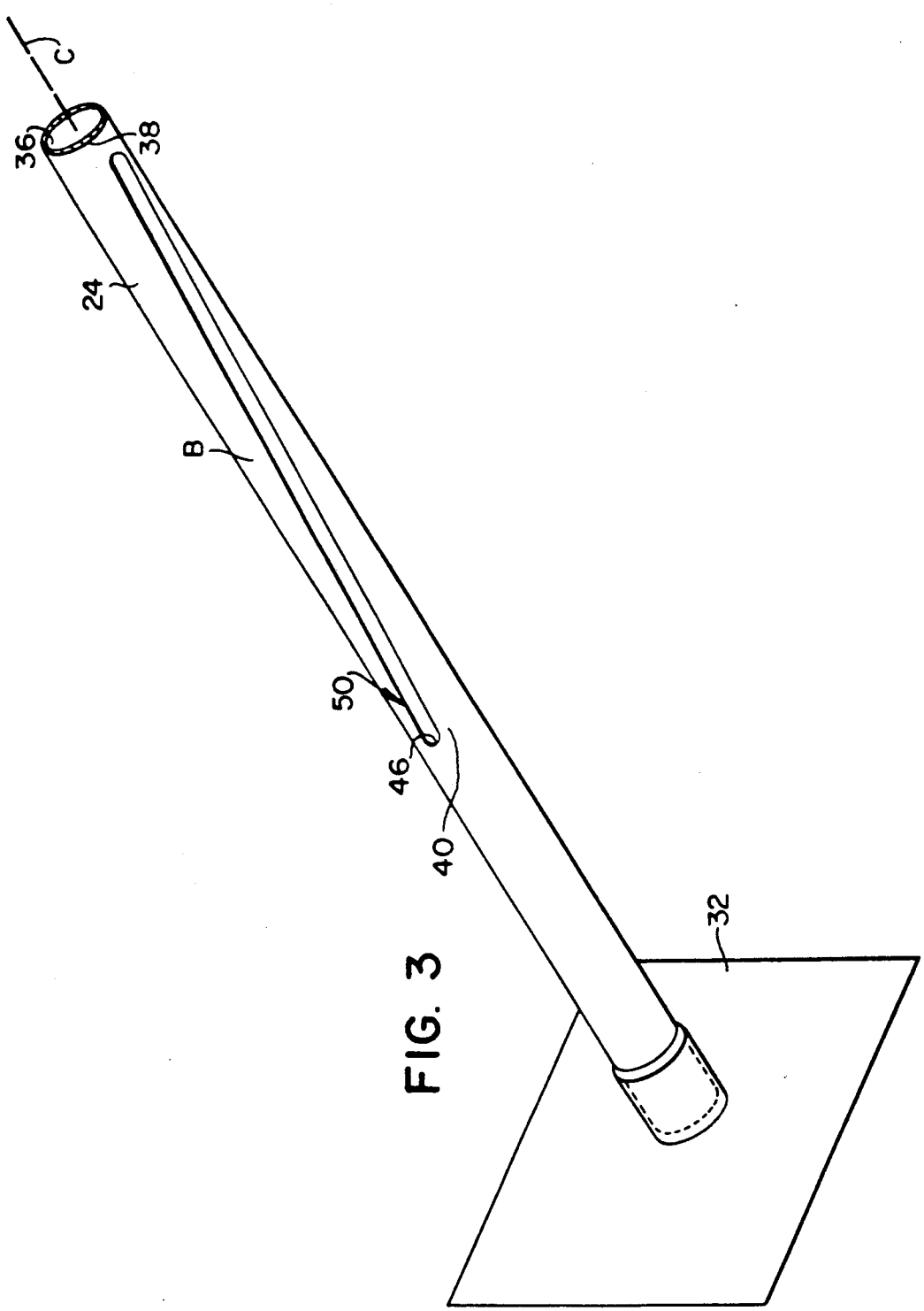
FIG. 3 is a side elevation view of a seasoning distribution tube in accordance with one embodiment of the invention.

FIG. 3 illustrates one embodiment of the invention wherein the seasoning distribution means is a slot 50 in the delivery section B of tube 24. The beginning 46 of slot 50 is located on a side 40 of tube 24 at least 45° from the bottom 38 of tube 24 as defined by horizontal axis C and vertical axis C'. In preferred embodiments, the beginning 46 of slot 50 is located at least about 90° from the bottom 38 of tube 24.

As can be seen in FIG. 3, slot 50 extends along the side 40 of tube 24 generally longitudinally toward the distal end 36 of the tube, while the orientation of the slot changes progressively downwardly toward the bottom 38 of the tube. A seasoning distribution slot thus positioned permits seasoning to exit the side of tube 24 at the proximal end of the seasoning delivery section, yet exit the bottom of the tube at the distal end of the seasoning delivery section.

In the embodiment shown in FIG. 3, slot 50 has a substantially uniform width within the range of from about ⅛ inch to about ½ inch, and the slot is inclined downwardly at an angle of greater than 0°, but less than about 15°, with respect to the longitudinal axis C of tube 24. In preferred embodiments, the slot is inclined downwardly at an angle of about 2° or less with respect to axis C.

Figure 4:
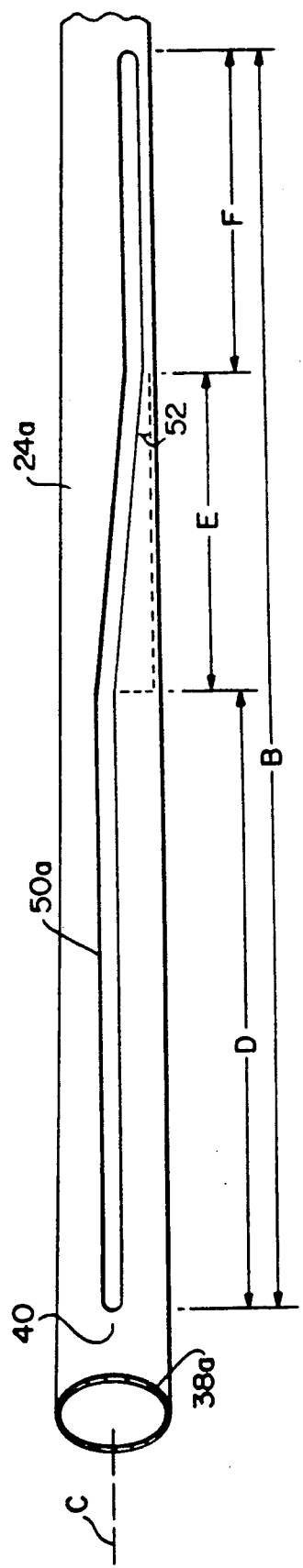
FIG. 4 is a side elevation view, somewhat schematic, of a seasoning distribution tube in accordance with a second embodiment of the present invention.

FIG. 4 illustrates the delivery portion B of a seasoning dispenser in accordance with another embodiment of the invention. In this embodiment, the seasoning distribution means is a slot 50a having substantially uniform width within the range of from about ⅛ inch to about ½ inch. A first portion D of slot 50a is located on a side 40 of the tube 24a at least 45° from the bottom 38a of the tube, preferably at least about 90° from bottom 38a. According to this embodiment, slot 50a extends substantially parallel to the longitudinal axis C of tube 24a along the first section D of slot 50a. A portion E of slot 50a is inclined downwardly at an angle 52 of greater than 0° with respect to longitudinally axis C of tube 24a, with angle 52 being less than about 15° with respect to axis C. In preferred embodiments, angle 52 is about 2° or less with respect to axis C. A final section F of slot 50a extends substantially parallel to axis C of tube 24a at or about the bottom 38a of tube 24a.

Figure 5:
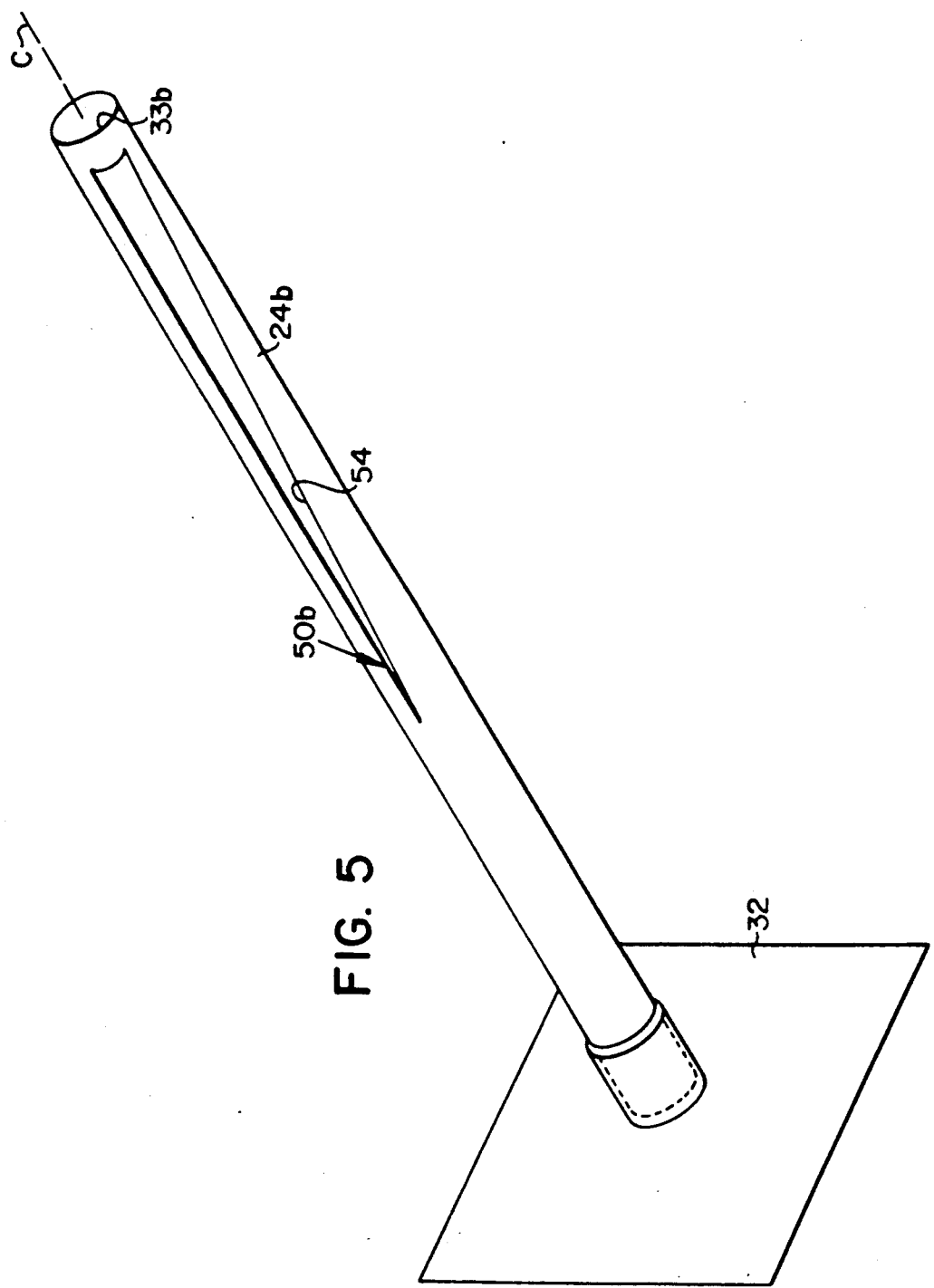
FIG. 5 is a perspective view of a seasoning distribution tube in accordance with a third embodiment of the present invention.

FIG. 5 illustrates an embodiment of the invention wherein the seasoning distribution means is a slot 50b having a width which increases from the beginning to the end of the slot. As in the previously described embodiments, the beginning of slot 50b is located on a side of the tube at least 45° from the bottom 38b thereof, preferably at least about 90° from the bottom of the tube. In preferred embodiments according to this aspect of the invention, slot 50b has a width at its beginning of about 1/16 inch, increasing to a width of about ⅜ inch at the end of slot 50b.

In the embodiment shown in FIG. 5, slot 50b has a lower edge 54 inclined downwardly at an angle of greater than 0° with respect to axis C of tube 24b, but less than about 15° with respect to axis C. In preferred embodiments, the lower edge 54 of slot 50b is inclined downwardly at an angle of about 2° or less with respect to axis C of tube 24b.

Distribution means other than a slot as previously described can be employed in the present invention. For example, a series of holes can be utilized in an array angularly positioned along the delivery section of the tube so as to dispense seasoning from the side of the tube at the beginning (proximal end) of the delivery section and from the bottom of the tube at the distal end of the delivery section.

In the embodiments of the invention illustrated in FIGS. 1-5, seasoning is delivered by auger 26 from hopper 32, through the length of the tube, for delivery through the seasoning dispenser slot. As indicated by arrows 35 in FIG. 1, the seasoning is uniformly distributed in the form of a dispersion "curtain". In the embodiment shown in FIG. 1, the auger 26 has a uniform pitch throughout tube 24. In preferred embodiments, the pitch length of the auger within the tube is in the range of from about 1" to about 3". In preferred embodiments, the pitch length to tube diameter has a ratio of ≧ about 1.6.

In other embodiments of the invention, the auger has two or more regions having different pitch lengths wherein each of the different pitch lengths of the auger is in the range of from about 1" to about 3". Depending on the types and consistencies of the seasonings being dispersed, a region of the auger in the feed section A of the tube can have a pitch length greater than or less than a region of the auger in the delivery section B of the tube.

Figure 6:
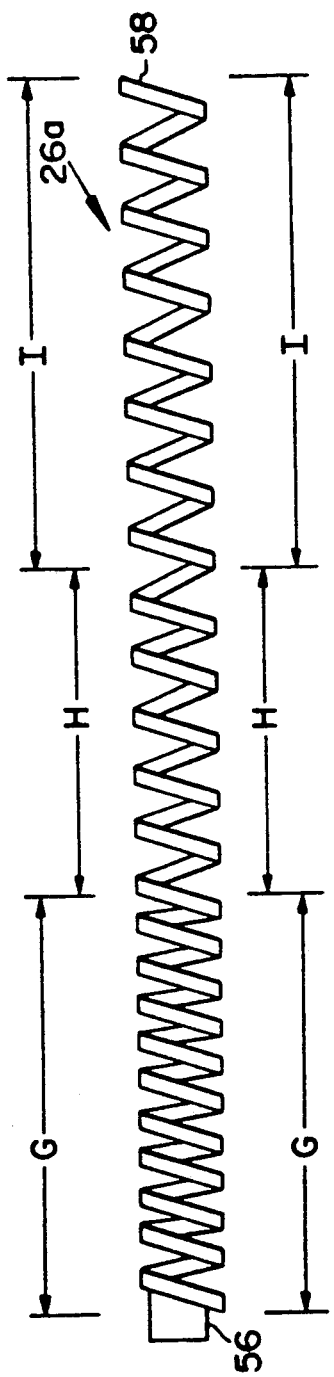
FIG. 6 is a schematic side elevation view of a triple-pitch auger having ascending pitch for use in accordance with one embodiment of the invention.
Figure 7:
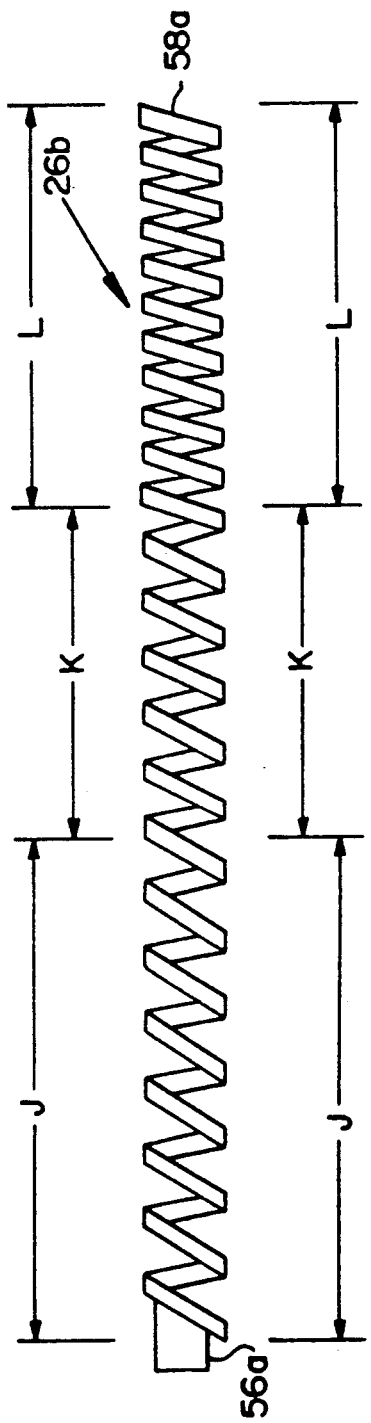
FIG. 7 is a schematic side elevation view of a triple-pitch auger with descending pitch for use in another embodiment of the present invention.

FIG. 6 illustrates an embodiment of the invention including an auger having three regions G, H and I with different pitch lengths in an ascending array. FIG. 7 illustrates an embodiment with an auger having three regions J, K and L with different pitch lengths in a descending array. In both cases, each of the different pitch lengths is preferably in the range of from about 1" to about 3". In both of the embodiments shown in FIGS. 6 and 7, the ratio of the shortest of the pitch lengths to the longest of the pitch lengths for each auger is preferably about 2 or less, more preferably from about 1.5 to about 1.8.

The ascending-pitch auger 26a shown in FIG. 6 has a hopper (proximal) end 56 and a distal end 58 for rotation adjacent the outer, distal end of the delivery tube. According to this embodiment, region G of auger 26a is positioned in the feed section of the delivery tube, and has a pitch length less than region I which is disposed in the delivery section of the delivery tube. Region H of auger 26a, between regions G and I thereof, has a pitch length greater than that of region G but less than that of region I. An auger with ascending pitch as shown in FIG. 6 provides greater flow toward the end of the delivery section and is particularly useful for fast-flowing, dry powdery seasoning materials such as flour salt.

In the embodiment shown in FIG. 7, descending-pitch auger 26b has a proximal end 56a adjacent the hopper and a distal end 58a for rotation adjacent the distal end of the dispensing tube. According to this embodiment, region J of auger 26b, which is disposed in the feed section of, the dispensing tube, has a pitch length greater than that of region L which is disposed at the distal end of the delivery section of the tube. Region K of auger 26b, located between regions J and L thereof, has a pitch length less than that of region J but greater than that of region L. An auger as illustrated in FIG. 7 having a descending pitch arrangement provides less flow at the distal of the delivery section than at the proximal end is particularly useful for the slow-flowing, "clumpy" or "sticky"-type seasoning materials.

By utilizing the angled seasoning distribution means of the present invention in combination with various auger configurations, extremely accurate dispensing of a wide variety of seasonings can be achieved, while reducing or eliminating seasoning drainage after the auger is stopped. Also, a much more uniform dispersion following start-up of a dispenser according to the invention is achieved, as compared to prior art seasoning dispensers.

Figure 8:
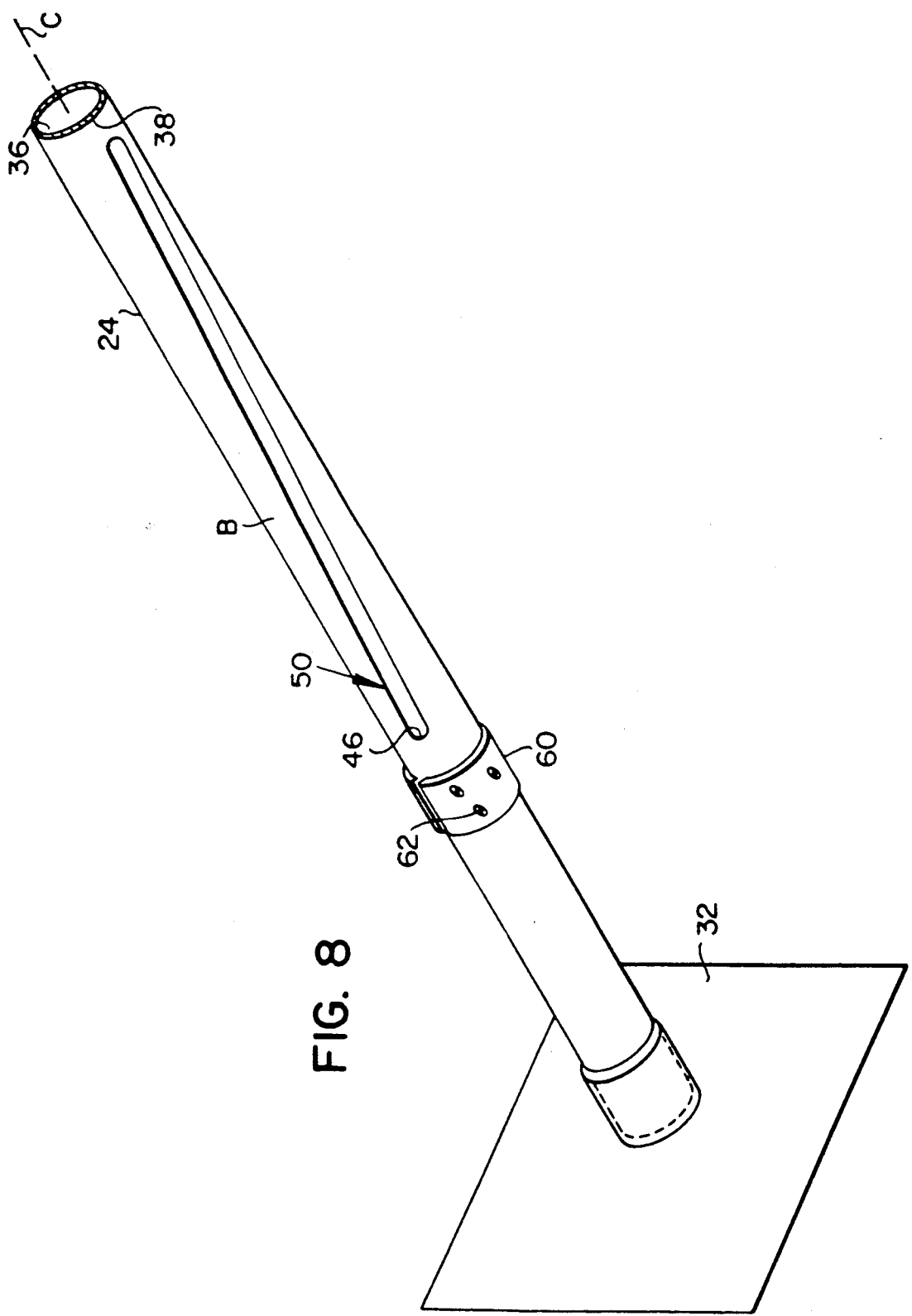
FIG. 8 is a side elevation view of another embodiment of a seasoning distribution tube.

FIG. 8 illustrates an embodiment of the distribution tube having fastening collar 60. The length of the seasoning powder curtain can be varied by loosening the screws 62 and then rotating the tube 24. The operator will thus be able to optimize the length of the distribution means for the flow characteristics of various toppings. The position of tube 24 is fixed by tightening screws 62 so they engage tube 24.

The invention is further illustrated by the following examples, which are not intended to be limiting.

EXAMPLE 1

A dispensing tube as illustrated in FIG. 3 was tested along with a descending triple-pitched auger as illustrated in FIG. 7 (System A) against a seasoning dispenser configured with bottom dispensing holes in accordance with U.S. Pat. No. 4,614,162 (System B). Both systems utilized a 1¾ inch-diameter dispensing tube The System A dispensing tube had a 36-inch slot length which was 5/16 inch wide and inclined at an angle of 1.1°. The System A auger had a region J length of 46 inches (pitch length 2.5 inches), a region K length of 12 inches (pitch length 2.5 inches), and a region L length of 14 inches (pitch length 1.375 inches). System A in accordance with the invention was tested against System B in accordance with U.S. Pat. No. 4,614,162 on Nacho Cheese DORITOS ® product. Both systems were operated so as to season approximately 400 pounds per hour of the product at a seasoning delivery rate of about 43.2 pounds per hour. With both systems, approximately 50 gram samples were collected at the tumbler exit and analyzed for seasoning coverage. The sampling interval was about 3 minutes for both systems. Seasoning coverage was assessed based on the weight of sample that had coverage on both sides, one side only or no seasoning coverage on either of the sides. The results are shown in Table 1 below.

TABLE 1

| Sample Source | Seasoning Coverage | | | |
|---|---|---|---|---|
| | % with Coverage on Both Sides | Coverage on One Side | No Coverage | No of Samples |
| System A | 91.9% | 5.9% | 2.2% | 45 |
| System B | 71.9% | 23.7% | 4.4% | 32 |

As can be seen from Table 1, System A in accordance with the present invention resulted in a higher percentage of samples with coverage on both sides, a lower percentage of samples with coverage on only one side, and a lower percentage of samples having no coverage at all, as compared to System B.

EXAMPLES 2-6

A 13 inch variable width slot on a 1 inch diameter tube was used to deliver a uniform curtain of Nacho Cheese flavored seasoning in a batch tumbling application. A 36 inch long, 5/16 inch slot with constant width and inclined at an angle of approximately 0.39° on a 1¾ inch tube was found to work well with poorly flowable powders such as sour cream and onion topping. A 15 inch long, 5/16 inch slot with constant width and inclined at an angle of approximately 1.1° on a 1 inch diameter tube was found to be particularly useful for salting applications. A 24 inch long, 5/16 inch slot with constant width and inclined at an angle of approximately 1.1° on a 1 inch diameter tube was advantageously utilized for another salting application. An ascending-pitch auger as illustrated in FIG. 6, having a dimension G of 46 inches (pitch length 1⅞ inches), a dimension H of 12 inches (pitch length 2¼ inches) and a dimension I of 14 inches (pitch length 2½ inches) was found to provide greater flow toward the end of the seasoning delivery section and, thus, was particularly useful for fast-flowing powder.

Since many modifications, variations and changes in detail may be made to the described embodiments, it is intended that all matter in the foregoing description and shown in the accompanying drawings be interpreted as illustrative and not in a limiting sense.

What is claimed is:

1. A dispenser apparatus for distributing a seasoning material and comprising a tube having a bottom as defined by a vertical and longitudinal axis through said tube, said tube having a proximal end in communication with a source of seasoning material and terminating at a distal end, and a transport means within the tube for moving the seasoning material in a downstream direction from the proximal end towards the distal end, the tube having a feed section adjacent the proximal end and a seasoning delivery section downstream of the feed section, the seasoning delivery section comprising seasoning distribution means for the seasoning material to exit the delivery section, wherein the seasoning distribution means are disposed on a side of the delivery section with a proximal end thereof disposed at least about 10° from the bottom of the tube, the distribution means extending longitudinally toward the distal end of the tube, with at least a portion of the distribution means so extending in a progressively downward manner with respect to the longitudinal axis of the tube.

2. The dispenser apparatus of claim 1 wherein the proximal end of the seasoning distribution means is at least about 45° from the bottom of the tube.

3. The dispenser apparatus of claim 1 wherein the seasoning distribution means comprises a slot in the delivery section of the tube.

4. The dispenser apparatus of claim 3 wherein the feed section has a length of from about 1½ feet to about 5 feet and the delivery section has a length of from about 1 foot to about 3 feet.

5. The dispenser apparatus of claim 4 wherein the tube has an inner diameter of from about 1 inch to about 2 inches.

6. The dispenser apparatus of claim 1 wherein the transport means comprises an auger.

7. The dispenser apparatus of claim 6 wherein at least a portion of said auger has a pitch length in the range of from about 1 inch to about 3 inch.

8. The dispenser apparatus of claim 7 wherein the pitch length and tube diameter are in a ratio of ≧ about 1.6.

9. The dispenser apparatus of claim 8 wherein the auger has at least two regions having different pitch lengths, each of said different pitch lengths being in the range of from about 1 inch to about 3 inch.

10. The dispenser apparatus of claim 9 wherein a region of said auger in said feed section has a pitch length greater than a region of said auger in said delivery section.

11. The dispenser apparatus of claim 9 wherein a region of said auger in said feed section has a pitch length less than a region of said auger in said delivery section.

12. The dispenser apparatus of claim 9 wherein said auger has three regions having different pitch lengths, each of said different pitch lengths being in the range of from about 1 inch to about 3 inch.

13. The dispenser apparatus of claim 12 wherein the ratio of the shortest of said pitch lengths to the longest of said pitch lengths is about 2 or less.

14. The dispenser apparatus of claim 13 wherein said ratio is from about 1.5 to about 1.8.

15. The dispenser apparatus of claim 12 wherein a first region of said auger in said feed section has a pitch length greater than a second region of said auger at the distal end of said delivery section, with a region of said auger between the first and second regions having a pitch length less than that of the first region but greater than that of the second region.

16. The dispenser apparatus of claim 12 wherein a first region of said auger in said feed section has a pitch length less than a second region of said auger at the distal end of said delivery section, with a region of said auger between the first and second regions having a pitch length greater than that of the first region but less than that of the second region.

17. The dispenser apparatus of claim 3 wherein said slot has a width which increases from a proximal end of the seasoning distribution means to a distal end of the seasoning distribution means.

18. The dispenser apparatus of claim 17 wherein the width of said slot is about 1/16 inch at the proximal end of the seasoning distribution means, and increases to a width of about ¼ inch at the distal end of the seasoning distribution means.

19. The dispenser apparatus of claim 17 wherein said slot has a lower edge inclined downwardly at an angle of greater than 0° and less than about 15° with respect to a longitudinal axis of said tube.

20. The dispenser apparatus of claim 19 wherein said lower edge is inclined downwardly at an angle of about 2° or less with respect to said axis.

21. The dispenser apparatus of claim 3 wherein said slot has a substantially uniform width.

22. The dispenser apparatus of claim 21 wherein said slot has a width within the range of from about ⅛ inch to about ½ inch.

23. The dispenser apparatus of claim 21 wherein at least a portion of said slot is inclined downwardly at an angle of greater than 0° and less than about 15° with respect to a longitudinal axis of the tube.

24. The dispenser apparatus of claim 23 wherein said angle is at an angle of about 2° or less with respect to said axis.

25. The dispenser apparatus of claim 1 further comprising means for varying the length of a seasoning powder curtain.

26. The dispenser apparatus of claim 25 wherein said means for varying the length of the seasoning powder curtain comprises a collar disposed around the tube.

27. A method for distributing seasoning material, comprising feeding seasoning material from a hopper through a dispenser apparatus according to claim 1.

28. A dispenser apparatus for distribution a seasoning material and comprising a tube having a bottom as defined by a vertical and longitudinal axis through said tube, said tube having a proximal end in communication with a source of seasoning material and terminating at distal end, and a transport means within the tube for moving the seasoning material in a downstream direction from the proximal end towards the distal end, the tube having a feed section adjacent the proximal end and a seasoning delivery section downstream of the feed section, the seasoning delivery section comprising seasoning distribution slot formed in said tube for the seasoning material to exit the delivery section, wherein the seasoning distribution slot is disposed on a side of the delivery section with a proximal end thereof disposed at least about 10° from the bottom of the tube, the distribution slot extending longitudinally toward the distal end of the tube, with at least a portion of the distribution slot so extending in a progressively downward manner with respect to a longitudinal axis of the tube.

* * * * *

UNITED STATES PATENT AND TRADEMARK OFFICE
CERTIFICATE OF CORRECTION

PATENT NO. : 5,090,593
DATED : February 25, 1992
INVENTOR(S) : Ofomata E. Ejike

It is certified that error appears in the above-identified patent and that said Letters Patent is hereby corrected as shown below:

In the title "Seasoning" should be --Seasonings--.

Col. 6, line 12 "of," should be --of--.

Col. 10, line 4 (claim 28) "distribution" should be --distributing--.

Signed and Sealed this

Seventh Day of September, 1993

*Attest:*

BRUCE LEHMAN

*Attesting Officer*     *Commissioner of Patents and Trademarks*